(12) United States Patent
Felber

(10) Patent No.: US 11,519,533 B2
(45) Date of Patent: Dec. 6, 2022

(54) DEVICE FOR AXIALLY CONNECTING TWO PIPE ELEMENTS

(71) Applicant: Winfried Felber, Monheim (DE)

(72) Inventor: Winfried Felber, Monheim (DE)

( * ) Notice: Subject to any disclaimer, the term of this patent is extended or adjusted under 35 U.S.C. 154(b) by 45 days.

(21) Appl. No.: 16/091,710

(22) PCT Filed: Mar. 22, 2018

(86) PCT No.: PCT/EP2018/057360
§ 371 (c)(1),
(2) Date: Nov. 5, 2018

(87) PCT Pub. No.: WO2018/184864
PCT Pub. Date: Oct. 11, 2018

(65) Prior Publication Data
US 2020/0166164 A1  May 28, 2020

(30) Foreign Application Priority Data

Apr. 4, 2017 (DE) .......................... 102017107258.6

(51) Int. Cl.
*F16L 21/00* (2006.01)
*F16L 25/14* (2006.01)
*B29L 31/24* (2006.01)
*F16L 17/04* (2006.01)
*F16L 21/06* (2006.01)
(Continued)

(52) U.S. Cl.
CPC .............. *F16L 21/005* (2013.01); *F16L 25/14* (2013.01); *B29L 2031/24* (2013.01); *E03F 2005/0416* (2013.01); *F16L 17/04* (2013.01); *F16L 21/065* (2013.01); *F16L 21/08* (2013.01); *F16L 25/12* (2013.01)

(58) Field of Classification Search
CPC ......... F16L 25/14; F16L 21/005; F16L 25/12; F16L 17/04; F16L 21/06
See application file for complete search history.

(56) References Cited

U.S. PATENT DOCUMENTS 4,186,948 A   2/1980   Cronk
4,380,348 A   4/1983   Swartz

FOREIGN PATENT DOCUMENTS

DE       2157192 A      7/1972
DE    102007061288 A1   6/2009
(Continued)

*Primary Examiner* — Matthew Troutman
*Assistant Examiner* — Alexander T Rufrano
(74) *Attorney, Agent, or Firm* — Rimon PC

(57) ABSTRACT

A device for axially connecting two pipe elements, including a coupling means with a first coupling means part assignable to a first pipe element, a second coupling means part and an intermediate connecting part arrangeable between the two coupling means parts, wherein a first articulation element formed on the first or second coupling means part is configured to cooperate with a second articulation element formed on the intermediate connecting part, in particular in a positive manner, forming an articulated connection between the first or second coupling means part and the intermediate connecting part, or a second articulation element formed on the first or second coupling means part is configured to cooperate with a first articulation element formed on the intermediate connecting part, forming an articulated connection between the first or second coupling means part and the intermediate connecting part.

16 Claims, 8 Drawing Sheets

Figure 1:
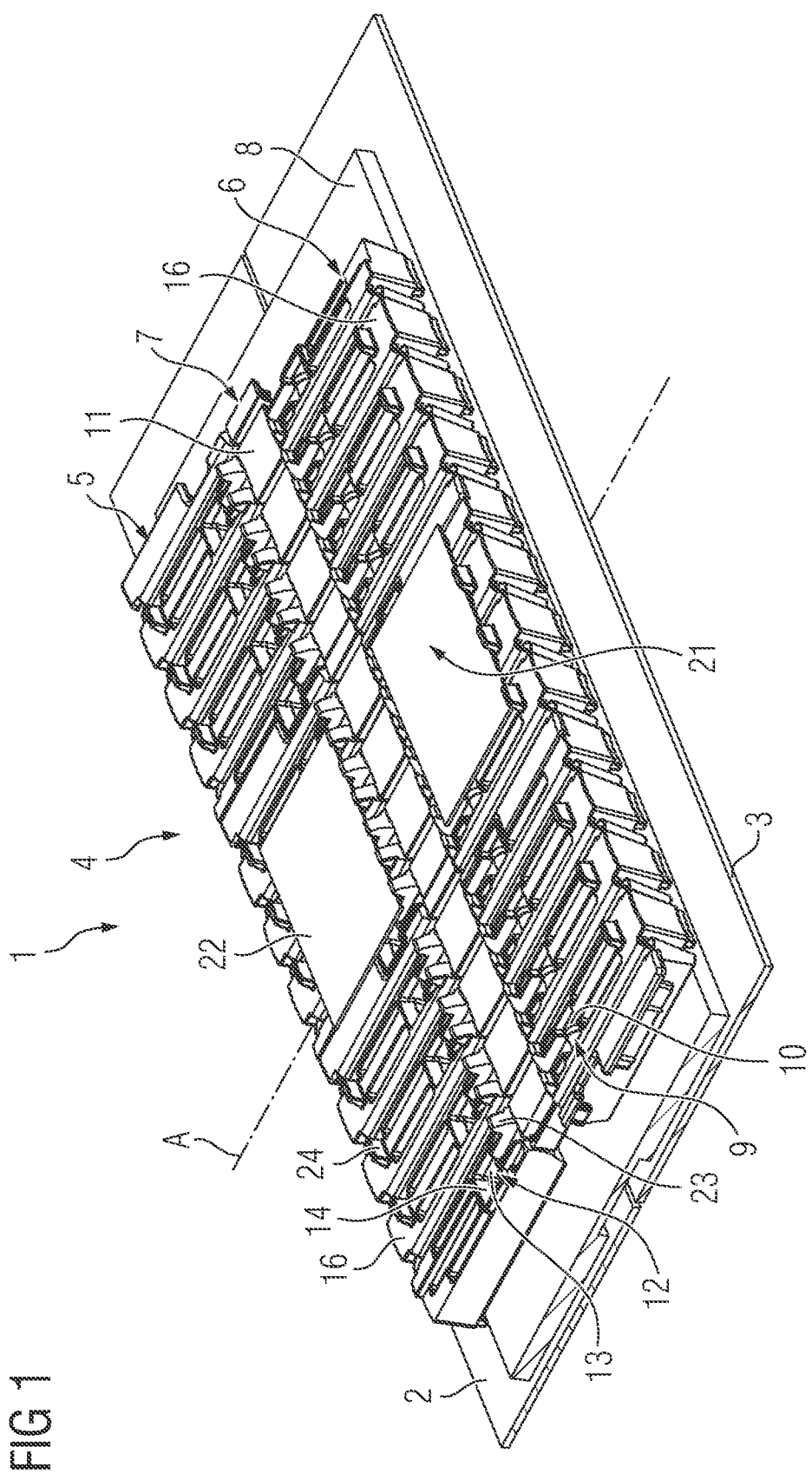
Figure 2:
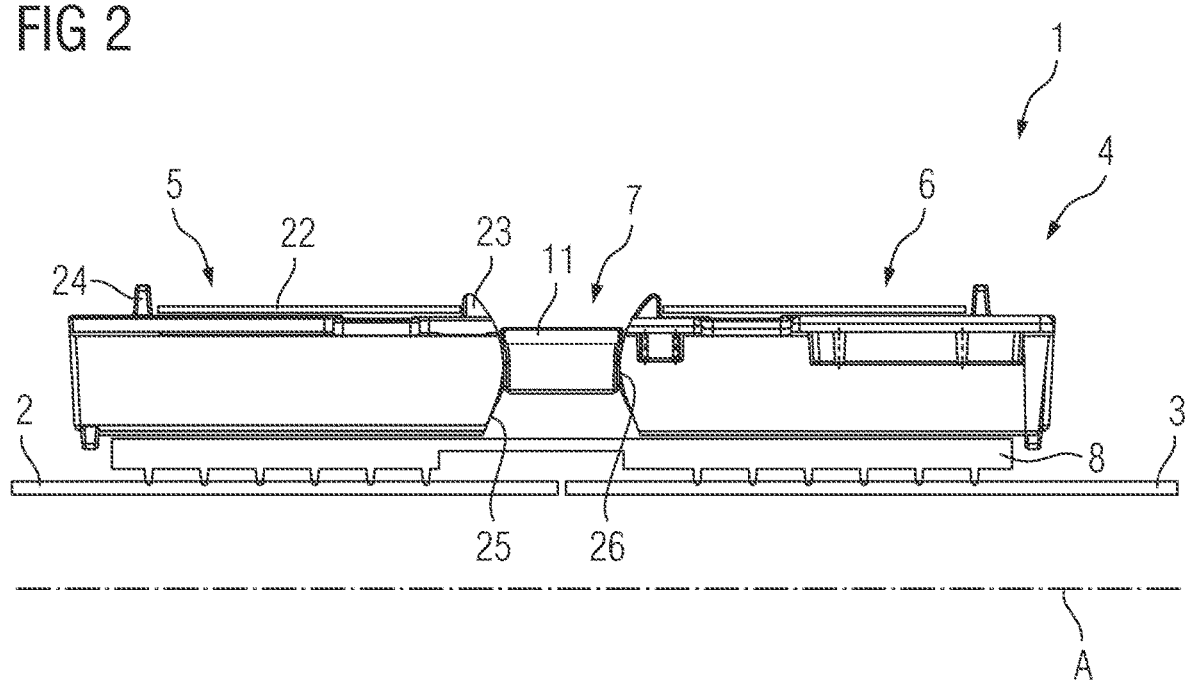

(51) Int. Cl.
*F16L 21/08* (2006.01)
*F16L 25/12* (2006.01)
*E03F 5/04* (2006.01)

(56) References Cited

FOREIGN PATENT DOCUMENTS

| | | | |
|---|---|---|---|
| DE | 202008018078 U1 | 10/2011 |
| DE | 202010013624 U1 | 12/2011 |
| DE | 102012101553 A1 | 8/2013 |
| DE | 102012005943 A1 | 9/2013 |
| DE | 202013101678 U1 | 7/2014 |
| EP | 2988046 A1 | 2/2016 |
| EP | 3037707 A1 | 6/2016 |

DEVICE FOR AXIALLY CONNECTING TWO PIPE ELEMENTS

This application is a U.S. national stage entry under 35 U.S.C. § 371 of International Application serial no. PCT/EP2018/057360 filed Mar. 22, 2018, which claims priority to German Patent Application serial no. 102017107258.6 filed Apr. 4, 2017. The contents of these applications are incorporated herein by reference in their entirety.

The invention relates to a device for axially connecting two pipe elements, in particular two pipe elements with non-identical external diameters, comprising a coupling means with a first coupling means part having a cylindrical shape in the assembled state of the device, which can be assigned to a first pipe element, and a second coupling means part having a cylindrical shape in the assembled state of the device, which can be assigned to a second pipe element to be connected axially to the first pipe element.

A device of this type for connecting two pipe elements, i.e. for example two pipeline elements through which a fluid can or does flow, is known in principle, e.g. from DE 10 2007 061 288 A1, and is employed e.g. in the area of underground engineering, i.e. in particular pipeline construction, or in the area of sanitary or sewage engineering.

With a device of this type there is a requirement for high mechanical stability of the connection of appropriate pipe elements that can be made or is made by means thereof, and for a high degree of flexibility or practicality in terms of the ability to connect pipe elements with different, possibly very different, external diameters. A device of this type should therefore be configured such that an extremely stable connection of a wide variety of pipe elements with different, possibly very different, external diameters is possible. This is true in particular with regard to the bridging of large radial steps which is necessary when connecting pipe elements with (significantly) different external diameters; in this case the device should be subjected to the lowest possible mechanical stress, in particular by material deformation, at least in a bridging region typically formed by a joint area of respective pipe elements to be connected.

The invention is based on the object of providing an improved device for axially connecting two pipe elements, which in particular allows large radial steps to be bridged without being subjected to particular mechanical stress in the bridging region, in particular by material deformation.

The object is achieved by a device for axially connecting two pipe elements, in particular with non-identical external diameters, according to the claims. The dependent claims relate to possible embodiments of the device.

The device described herein ("device") is used for axially connecting two, in particular tubular, pipe elements or pipe element sections through which a fluid, i.e. a liquid or a gas, typically can or does flow during operation (simply the term "pipe element" is used below) and thus for forming an axial, typically leak-proof connection of appropriate pipe elements. The pipe elements which are to be connected, or which are connected, by means of the device are typically arranged with respective sections forming respective end faces or end sides positioned opposite each other, in particular abutting each other, and in the operational or assembled state of the device they are surrounded around their external circumferences by certain functional components of the device forming an axial connection.

Although, of course, pipe elements with (substantially) the same configurations, i.e. in particular with the same external diameters, can be connected in a stable manner using the device, the device is in particular configured to connect pipe elements with significantly different configurations, i.e. in particular with external diameters lying far outside a tolerance range resulting e.g. from manufacturing, in a stable manner. By means of the device considerable radial steps of up to 100 mm or more between respective pipe elements to be connected can be bridged. Corresponding radial steps to be bridged by means of the device can be attributed to the different configurations, in particular the different external diameters, of respective pipe elements which are to be connected. The connection of the pipe elements that is made, or that is to be made, by means of the device can be formed coaxially or concentrically, i.e. the axes of symmetry or central axes of respective pipe elements coincide (substantially) with the common axis of symmetry or central axis of the device.

A first pipe element to be connected to a second pipe element by means of the device can be a section, in particular an end section, of a pipe. A second pipe element to be connected to the first pipe element can likewise be a section, in particular an end section, of a pipe. The device can therefore be configured to function as a pipe coupling means for connecting two pipes. In this case, the device can be referred to or regarded as a pipe coupling means. However, a first pipe element to be connected to a second pipe element by means of the device can also be a fixed tubular section, in particular a tubular end section, of a flange means. The second pipe element in this case is typically part of a coupling means of the device. The device can therefore be configured to function as a flange means for connecting a pipe element to a flange means. In this case, the device can be referred to or regarded as a flange means.

Naturally, pipe elements composed of materials that are chemically/physically identical, similar or different can be connected by means of the device, regardless of their external diameter. For example, pipe elements composed of construction materials, in particular concrete; ceramics, in particular stoneware; plastics; metal etc. can be connected by means of the device.

The device comprises a coupling means as a central functional unit. The coupling means comprises as functional components a first, typically hollow-cylinder-like or hollow cylindrical, coupling means part, referred to for short below as a first coupling means part, a second, typically hollow-cylinder-like or hollow cylindrical, coupling means part, referred to for short below as a second coupling means part, and an intermediate connecting part. The first coupling means part can be assigned to a first pipe element or is assigned thereto in the operational or assembled state of the device. The second coupling means part can be assigned to a second pipe element which is to be connected, or which is connected, axially to the first pipe element, or is assigned thereto in the operational or assembled state of the device. The intermediate connecting part can be arranged, or in the operational or assembled state of the device is arranged, between the two coupling means parts; therefore, the two coupling means parts can be connected to each other or, in the operational or assembled state of the device, are connected to each other axially via the intermediate connecting part. The coupling means parts and the intermediate connecting part are each equipped with suitable mechanical interfaces for this purpose, which allow an axial coupling or connection thereof.

As mentioned above, the first coupling means part and the second coupling means part typically have a hollow cylindrical basic shape or are formed with such a shape or can be formed into such a shape. In principle, a hollow cylindrical basic shape is to be understood as including geometric shapes deviating from a geometrically clearly defined hollow cylinder, such as e.g. ellipses, ovals, etc. The coupling means parts can typically be modified or reduced in their diameter, i.e. they are expandable and/or compressible. The coupling means parts represent (substantially) those functional components of the device which engage around the external circumference of respective pipe elements that are to be connected to each other; the first coupling means part engages around the first pipe element which is assigned thereto in the region of its external diameter or circumference and the second coupling means part engages around the second pipe element which is assigned thereto in the region of its external diameter or circumference. In the operational or assembled state of the device, therefore, respective coupling means parts form cylindrical contact areas for respective pipe elements; this also applies if a sealing element, in particular a hollow cylindrical sealing element, is arranged between the coupling means parts and the pipe elements.

The intermediate connecting part can (likewise) have a hollow cylindrical, i.e. in particular a ring-like or annular, basic shape. The essential point is that, in the operational or assembled state of the device, the intermediate connecting part can be brought into a cone-like or conical basic shape—which is to be understood as also including basic shapes deviating from a geometrically clearly defined cone, i.e. for example arc-like or curved basic shapes. The intermediate connecting part is brought into an appropriate cone-like or conical basic shape, in particular in association with the described bridging of a radial step which is necessary when axially connecting two pipe elements with (significantly) non-identical external diameters. Overall in this way, in particular when bridging radial steps, a coupling means with a (hollow) cylindrical/cone-like/(hollow) cylindrical geometric shape can be obtained. The (hollow) cylindrical sections are formed by the coupling means parts and the cone-like section is formed by the intermediate connecting part.

On the first coupling means part, on the second coupling means part and on the intermediate connecting part, at least one first articulation element and/or at least one second articulation element is formed or arranged in each case. A respective first articulation element is formed as an engaging element for engaging in a receiving region of a second articulation element. A respective second articulation element is formed as a receiving element comprising a receiving region for at least partly receiving an engaging element of a first articulation element. A first articulation element can therefore be received in a second articulation element, whereby at the same time at least one axial connection between respective articulation elements is formed. A first and a second articulation element are thus configured to cooperate in the sense of interconnecting parts that can be connected to each other. The cooperation of a first articulation element with a second articulation element therefore results in an axial coupling or connection of respective articulation elements or of the functional components of the coupling means associated therewith.

The coupling means parts and the intermediate connecting part are configured via the first and/or second articulation elements formed or arranged thereon such that the aforementioned axial coupling or connection of the coupling means parts can be formed with interposition of the intermediate connecting part. A respective first articulation element on the coupling means part side thus corresponds to a respective second articulation element on the intermediate connecting part side and a respective second articulation element on the coupling means part side thus corresponds to a respective first articulation element on the intermediate connecting part side, so that with the proviso that respective coupling means parts can be coupled or connected to each other axially with interposition of the intermediate connecting part, all possible configurations of respective first and second articulation elements are obtained. According to a purely exemplary configuration option, second articulation elements are arranged or formed on the coupling means parts and first articulation elements are arranged or formed on the intermediate connecting part.

It has been mentioned that the cooperation of a first articulation element with a second articulation element results in a coupling or connection of respective articulation elements. A first articulation element formed or arranged on the first or second coupling means part is configured here to cooperate, in particular in a positive manner, with a second articulation element formed or arranged on the intermediate connecting part, forming an articulated connection, i.e. in particular a rotary joint connection, optionally a ball joint connection, between the first or second coupling means part and the intermediate connecting part. Similarly, a second articulation element formed or arranged on the first or second coupling means part is configured to cooperate, in particular in a positive manner, with a first articulation element formed on the intermediate connecting part, forming an articulated connection, i.e. in particular a rotary joint connection, between the first or second coupling means part and the intermediate connecting part.

An engaging element forming a first articulation element can be formed as or can comprise e.g. a joint pin, in particular a cylindrical joint pin, defining an axis of articulation. A receiving element forming a second articulation element can be formed as or can comprise e.g. a joint pin receptacle, in particular a corresponding joint pin receptacle.

Respective first articulation elements can be secured in the state in which they are received in respective second articulation elements via securing means acting e.g. in a positive and/or non-positive manner, e.g. on a first or second coupling means part. Appropriate securing means can be e.g. securing bolts or pins or split pins passing through respective first articulation elements, in particular in the region of an axis of articulation defined by respective first articulation elements, i.e. typically in a circumferential direction.

The possibility of forming an articulated connection, which, as mentioned above, is to be understood in particular as a rotary joint connection, between the first coupling means part and the intermediate connecting part as well as between the second coupling means part and the intermediate connecting part results in a significantly improved device. The articulated connection is designed to absorb axially acting normal forces and radially acting transverse or shear forces and represents a possible way of enabling pipe elements with (significantly) different external diameters to be connected without any material deformation of the device in the bridging region typically formed by a joint area of the pipe elements to be connected. Undesirable material reactions caused by deformation, i.e. for example the formation of so-called stress whitening when the coupling means parts or the intermediate connecting part are formed from certain plastics materials, can therefore be avoided. The articulated connection allows a, typically continuous, articulated deflection or angular deflection of the intermediate connecting part relative to the coupling means parts and vice versa; the effort required for this purpose is close to zero and therefore the bridging of radial steps is possible with virtually no resistance. The articulated connection here allows a very high absorption of radially acting transverse or shear forces so that, in the operational or assembled state of the device, relative radial movements of the pipe elements to be connected which are caused by transverse or shear forces are (almost) ruled out. The above-mentioned coaxiality of the connection of the pipe elements made by the device can thus be ensured even when connecting pipe elements with (significantly) non-identical external diameters or in the bridging of (considerable) radial steps which is necessary for this purpose. The device thus enables (almost) any combination of pipe elements with identical or non-identical configurations, i.e. in particular identical or non-identical external diameters, to be connected to each other in a stable manner.

Overall, therefore, a device for axially connecting two pipe elements is provided which is improved over the prior art mentioned above.

The articulated connection formed by cooperation of a first articulation element formed on the first or second coupling means part with a second articulation element formed on the intermediate connecting part or the articulated connection formed by cooperation of a second articulation element formed on the first or second coupling means part with a first articulation element formed on the intermediate connecting part allows a, typically continuous, pivoting of the intermediate connecting part into multiple, i.e. in particular almost any, pivot positions relative to the first and/or second coupling means part. The intermediate connecting part can be pivoted relative to a coupling means part e.g. in an angular range of between 0 and ±180° in relation to a central axis of the device, preferably in an angular range of between 0 and ±90° in relation to the central axis of the device. The (continuous) pivotability of the intermediate connecting part relative to the coupling means parts contributes to the above-mentioned ability to connect (almost) any combination of pipe elements with identical or non-identical configurations, i.e. in particular with identical or non-identical external diameters, to each other in a stable manner using the device.

The articulated connection of the first coupling means part to the intermediate connecting part and the articulated connection of the second coupling means part to the intermediate connecting part are typically undetachable or non-releasable in all pivot positions of the intermediate connecting part relative to the first and/or second coupling means part in the operational or assembled state of the device. The articulated connection of the first coupling means part to the intermediate connecting part and the articulated connection of the second coupling means part to the intermediate connecting part are therefore typically formed such that, in the operational or assembled state of the device, even in extreme pivot positions in which the intermediate connecting part has been pivoted or angled in an extreme manner relative to the coupling means parts by a correspondingly severe pivoting movement, a release of the articulated connection, e.g. by a movement of an engaging element which is received in a receiving element out of the receiving element, is impossible.

As mentioned above, the intermediate connecting part can be brought into a cone-like or conical basic shape in the operational or assembled state of the device; in particular the intermediate connecting part is brought into an appropriate cone-like or conical basic shape in association with the bridging of a radial step, which is necessary when axially connecting two pipe elements with (significantly) non-identical external diameters. The formation of the cone-like basic shape of the intermediate connecting part is typically achieved by an appropriate pivoting of the intermediate connecting part relative to the coupling means parts in the operational or assembled state of the device. The device can therefore be formed with a central region which runs in a cone-like or conical manner extending in an axial direction between the first and second coupling means parts by a pivoting of the intermediate connecting part relative to the first and/or second coupling means part.

The intermediate connecting part can comprise at least one, in particular rib-like or rib-shaped or cuboid-like or cuboid-shaped, basic section. Individual, multiple or all basic sections typically represent an inherently rigid part in all geometries. A first articulation element formed on the intermediate connecting part, where present, can be formed directly on the basic section; this applies in particular to rib-like basic sections. An intermediate connecting part here can have a geometric shape like e.g. a bone or I-beam. It is also possible that a first articulation element formed on the intermediate connecting part, where present, can be formed on a projection projecting in a rib-like manner, in particular in an axial direction, from the basic section. A second articulation element formed on the intermediate connecting part, where present, can be formed by a recess or opening in the basic section forming a receiving region.

The first and/or second coupling means part can also comprise a basic section, in particular a cuboid-like or cuboid-shaped basic section. An appropriate basic section typically represents an inherently rigid part. A first articulation element formed on the first and/or second coupling means part, where present, can be formed on a projection projecting in a rib-like manner, in particular in an axial direction, from the basic section. A second articulation element formed on the first and/or second coupling means part, where present, can be formed by a recess in the basic section forming a receiving region.

The recess in a basic section of a coupling means part and/or in a basic section of the intermediate connecting part can be formed by at least one, in particular multiple, wall element(s) of the basic section defining the recess, wherein the at least one or at least one wall element forms an axial pull-out prevention means for an engaging element of a first articulation element engaging in the receiving region which, in the operational or assembled state of the device, prevents an axial movement of the first articulation element towards the axially opposite coupling means part. The wall element forming the axial pull-out prevention means can engage around and/or over part of an engaging element of a first articulation element engaging in the receiving region, in particular in a positive manner. By means of an appropriate axial pull-out prevention means of a first articulation element, therefore, a particularly stable connection, in an axial direction, of the coupling means parts to the intermediate connecting part is ensured. The stability of the connection of two pipe elements that can be made or is made by means of the device is thereby improved overall.

The recess in a basic section of a coupling means part and/or in a basic section of the intermediate connecting part can furthermore be formed by at least one, in particular multiple, wall element(s) of the basic section defining the recess, wherein the at least one or at least one wall element forms a radial pull-out prevention means for an engaging element of a first articulation element engaging in the receiving region which, in the operational or assembled state of the device, prevents a radial movement of the first articulation element relative to the coupling means part. The wall element forming the radial pull-out prevention means can engage around and/or over part of an engaging element of a first articulation element engaging in the receiving region, in particular in a positive manner. By means of an appropriate radial pull-out prevention means of a first articulation element, therefore, a particularly stable connection, in a radial direction, of the coupling means parts to the intermediate connecting part is ensured. The stability of the connection of two pipe elements that can be made or is made by means of the device is thereby improved overall.

A respective recess in a basic section of a coupling means part and/or in a basic section of the intermediate connecting part can be open to the outside or to the inside in a radial direction in relation to the axis of symmetry or central axis of the device. In this way, simple assembly and disassembly of the device are made possible. To assemble the device, respective engaging elements are arranged in respective recesses in a radial direction. To disassemble the device, respective engaging elements that are arranged in respective recesses are removed from respective recesses in a radial direction.

The axial dimensions (length) of a respective recess in a basic section of a coupling means part can, in principle, be freely selected. A recess can thus extend in an axial direction partially or completely through the basic section of the respective coupling means part. A corresponding rib-like shoulder projecting axially from a basic section on the intermediate connecting part side can be dimensioned in an axial direction such that, in the assembled state, it extends axially completely through a respective recess on the coupling means part side; a rib-like projection can therefore pass through a basic section of a coupling means part axially, so that an articulation element formed or arranged on a rib-like projection can abut an axially external end of the basic section. The radial dimensions (height) of respective recesses and/or of the basic sections overall can also be freely selected, in principle. By means of the selection of the axial dimensions (length) of the rib-like projection and/or correspondingly of the axial and/or radial dimensions of the recess, a lever effect and thus the transmission of forces, i.e. in particular of transverse or shear forces, of the rib-like projection can be achieved or can be influenced in a targeted manner. Similarly, by means of the selection of the axial dimensions of the rib-like projection and/or correspondingly of the axial recess, an undesirable angular deflection of the intermediate connecting part in a circumferential direction relative to the respective coupling means part can be prevented.

In the operational or assembled state of the device, respective recesses are typically closed off, so that engaging elements arranged therein cannot be removed therefrom. Respective recesses in respective basic sections of a first and/or second coupling means part which are open in a radial direction in relation to the central axis of the device typically open into a receiving channel extending in a circumferential direction around the first or second coupling means part for receiving a clamping element, in particular a strip-, sleeve- or clip-like clamping element, surrounding the first or second coupling means part in a circumferential direction.

The recesses can therefore be capable of being closed off in a radial direction by a clamping element that can be received or is received in the receiving channel at least partly, in particular completely, in particular such that an engaging element received in the receiving region cannot be moved out of the recess or the receiving region in a radial direction.

For an exemplary configuration of the coupling means with second articulation elements formed or arranged on the coupling means parts and first articulation elements formed or arranged on the intermediate connecting part, it is the case that a respective receiving region of a second articulation element on the coupling means part side can comprise a first receiving region section which, in the operational or assembled state of the device, receives a projection projecting in a rib-like manner from a basic section of an intermediate connecting part, and a second receiving region section, which in particular communicates with the first receiving region section and which, in the operational or assembled state of the device, receives a first articulation element formed on the rib-like projection. In this way, a device of particularly compact design, in particular in an axial direction, can be achieved. The same naturally also applies to other configurations of the coupling means.

A basic section of a first and/or second coupling means part can be formed, in the region of its free end facing an intermediate connecting part in an axial direction in the operational or assembled state of the device, with a guiding surface which, in particular, extends in a curved manner. A basic section of an intermediate connecting part can be formed, in the region of a free end which, in the operational or assembled state of the device, faces a first or second coupling means part in an axial direction, with an optionally corresponding mating surface, which in particular extends in the same curved manner in an opposite direction. Respective guiding and mating surfaces serve on the one hand to allow guided movements of the intermediate connecting part relative to the coupling means parts. Respective mating surfaces on the intermediate connecting part side can typically be moved (in the case of pivoting movements of the intermediate connecting part) relative to the first and/or second coupling means part along respective guiding surfaces on the coupling means part side. On the other hand, respective guiding and mating surfaces facing each other in an axial direction serve to absorb forces acting in an axial direction that may occur during operation of the device. To this extent, the guiding and mating surfaces can also be regarded or designated as axial stop and counter-stop surfaces respectively, which are designed to absorb forces acting in an axial direction. By means of the guiding and/or mating surfaces which may also be regarded as articulation sockets, in addition to the guiding performed by the first articulation elements received in respective second articulation elements a further guiding of the intermediate connecting part relative to respective coupling means parts is also possible, which is why the articulated connection described above is implemented in duplicate, whereby any desired structural design is possible in terms of axially acting compressive and tensile stresses.

A respective basic section on the coupling means part side can be formed with a radial stop surface defining an articulation end position of the intermediate connecting part relative to the respective coupling means part. By defining appropriate articulation end positions, the stability of the device can be further increased since an angular deflection or pivoting of the intermediate connecting part relative to the coupling means parts is possible only to a defined degree. A respective radial stop surface can be formed as a ramp surface extending in an axial direction in a ramp-like manner with a specific angle of inclination in relation to the central axis of the device. By means of the angle of inclination of the ramp surface, the respective angle of the articulation end position of the intermediate connecting part relative to the respective coupling means part can be defined or is defined.

Although described above by way of example as cuboid-like or cuboid-shaped in each case, respective basic section [s] of an intermediate connecting part and/or respective basic sections of a first and/or second coupling means part can naturally also have other basic shapes or geometries, i.e. in particular other cross-sectional geometries. For example, a basic section of an intermediate connecting part can also, as mentioned above, have a rib-like basic shape or geometry.

The intermediate connecting part can be formed in a segmented manner in a circumferential direction. The intermediate connecting part which is formed in a segmented, and thus multi-part or multi-piece, manner can comprise multiple intermediate connecting part segments, each comprising at least one basic section, which can be connected in a circumferential direction to form the intermediate connecting part. Each intermediate connecting part segment thus comprises at least one basic section. Each intermediate connecting part segment extends in a circumferential direction around a portion of the overall extent, in a circumferential direction, of the intermediate connecting part.

Respective intermediate connecting part segments can be formed, in particular in the region of their basic section regions that are arranged adjacently in a circumferential direction in the operational or assembled state of the device, with connection elements which are formed for the connection, in particular the releasable connection (in a damage-free or non-destructive manner), of immediately adjacently arranged intermediate connecting part segments in a circumferential direction. Respective connection elements can be formed as positively locking elements, i.e. for example as plug-in elements, latching/snap elements, etc., which cooperate forming a positive connection of respective adjacently arranged intermediate connecting part segments, in particular in a circumferential direction.

As mentioned above, an intermediate connecting part segment comprises at least one basic section. For an intermediate connecting part segment comprising multiple basic sections arranged adjacently in a circumferential direction, it is the case that multiple basic sections arranged immediately adjacently in a circumferential direction can be connected to each other via at least one structural element which is expandable and/or compressible in a circumferential direction and which is in particular pleat-like. As a result of the formation or arrangement of appropriate structural elements between basic sections of a respective intermediate connecting part segment that are arranged immediately adjacently in a circumferential direction, the intermediate connecting part segment has expandable and/or compressible properties in a circumferential direction. The structural elements are typically designed such that they allow an expansion and/or compression of a respective intermediate connecting part segment in a circumferential direction, providing space. The intermediate connecting part formed from multiple corresponding intermediate connecting part segments can therefore be expanded and/or compressed in a circumferential direction in the operational or assembled state of the device, which is advantageous for the above-mentioned connection of pipe elements of any type that is possible by means of the device.

An appropriate structural element can be formed e.g. by multiple structural element sections oriented at an angle to each other, in particular in a V-shape. By means of appropriate structural element sections, (largely) axially extending slot structures can be formed. In all cases, appropriate slot structures provide sufficient space for an appropriate expansion and/or compression of respective intermediate connecting part segments and/or of the intermediate connecting part in a circumferential direction.

Appropriate structural element sections can be spaced apart such that, in the operational or assembled state of the device, they are (substantially) immediately adjacent to each other in a circumferential direction in the region of the inner circumference of the device. The inner circumference of the intermediate connecting part can therefore be (substantially) closed in the operational or assembled state of the device. An optionally present, in particular hollow cylindrical, sealing element arranged between the coupling means and the pipe elements to be connected is thus not given the ability to be pressed in a radial direction into gaps, which would be formed e.g. between structural element sections arranged adjacently in a circumferential direction.

Similarly to the intermediate connecting part, at least one coupling means part, typically both coupling means parts, can also be formed in a segmented manner in a circumferential direction. A coupling means part formed in a segmented, and therefore multi-part or multi-piece, manner can comprise multiple coupling means part segments, each comprising at least one basic section, which can be connected in a circumferential direction to form the coupling means part. Each coupling means part segment thus comprises at least one basic section. Each coupling means part segment extends in a circumferential direction around a portion of the overall extent of the respective coupling means part in a circumferential direction.

Respective coupling means part segments can be formed, in particular in the region of their basic section regions that are arranged adjacently in a circumferential direction in the operational or assembled state of the device, with connection elements, which are formed for the connection, in particular the releasable connection (in a damage-free or non-destructive manner), of immediately adjacently arranged coupling means part segments in a circumferential direction. Respective connection elements can be formed as positively locking elements, i.e. for example as plug-in elements, latching/snap elements, etc., which cooperate forming a positive connection of respective coupling means part segments arranged adjacently, in particular in a circumferential direction.

As mentioned above, a coupling means part segment comprises at least one basic section. For a coupling means part segment comprising multiple basic sections arranged adjacently in a circumferential direction, it is the case that multiple basic sections arranged immediately adjacently in a circumferential direction can be connected to each other via at least one structural element which is expandable and/or compressible in a circumferential direction and which is in particular pleat-like. As a result of the formation or arrangement of appropriate structural elements between basic sections of a respective coupling means part segment that are arranged immediately adjacently in a circumferential direction, the coupling means part segment has expandable and/or compressible properties in a circumferential direction. The structural elements are typically designed such that they allow an expansion and/or compression of a respective coupling means part segment in a circumferential direction, providing space. A coupling means part formed from multiple corresponding coupling means part segments can therefore be expanded and/or compressed in a circumferential direction in the operational or assembled state of the device, which is advantageous for the above-mentioned connection of pipe elements of any type that is possible by means of the device.

A structural element can be formed e.g. by multiple structural element sections oriented at an angle to each other, in particular in a V-shape. By means of appropriate structural element sections, (largely) axially extending slot structures can be formed. In all cases, appropriate slot structures provide sufficient space for an appropriate expansion and/or compression of respective coupling means part segments and/or of the coupling means part in a circumferential direction.

Appropriate structural element sections can be spaced apart such that, in certain states of operation or assembly of the device, they are (substantially) immediately adjacent to each other in a circumferential direction in the region of the inner circumference of the device. The inner circumference of the respective coupling means part can therefore be (substantially) closed in the operational or assembled state of the device. An optionally present, in particular hollow cylindrical, sealing element arranged between the coupling means and the pipe elements to be connected is thus not given the ability to be pressed in a radial direction into gaps, which would be formed e.g. between structural element sections arranged immediately adjacently in a circumferential direction.

Figure 7:
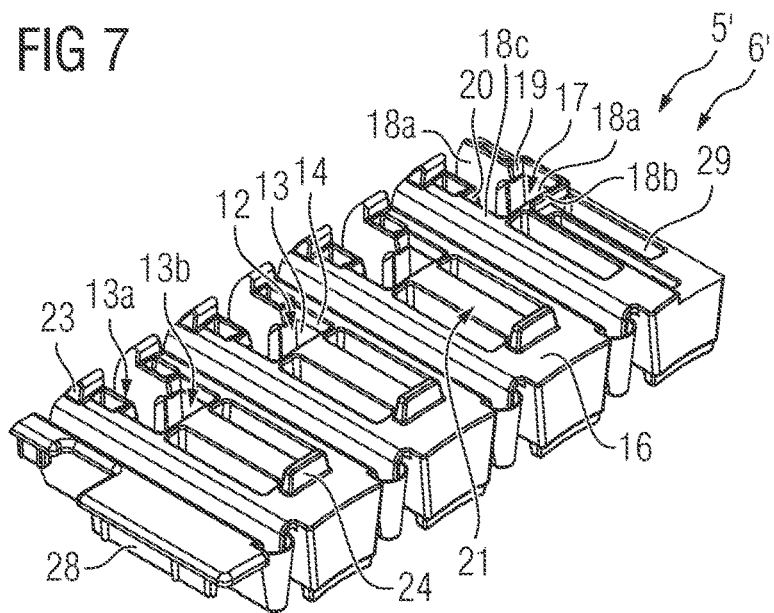
Figure 8:
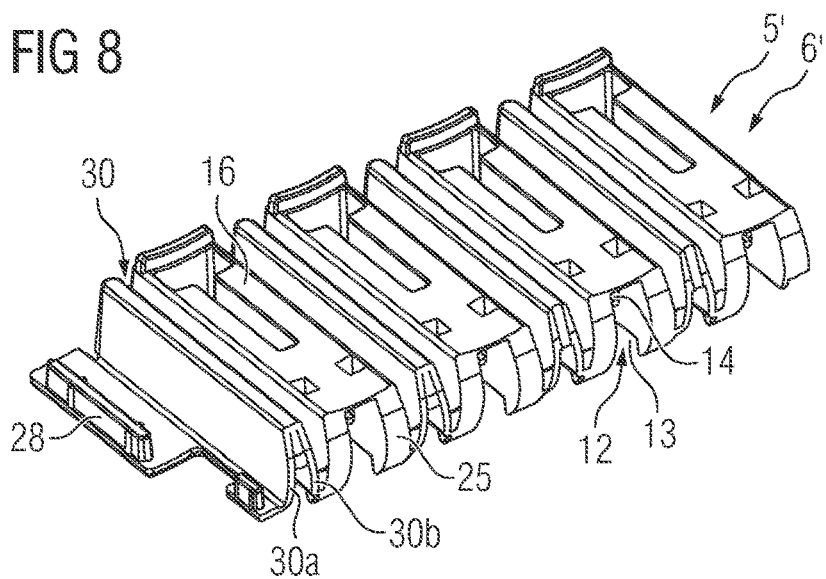
Figure 9:
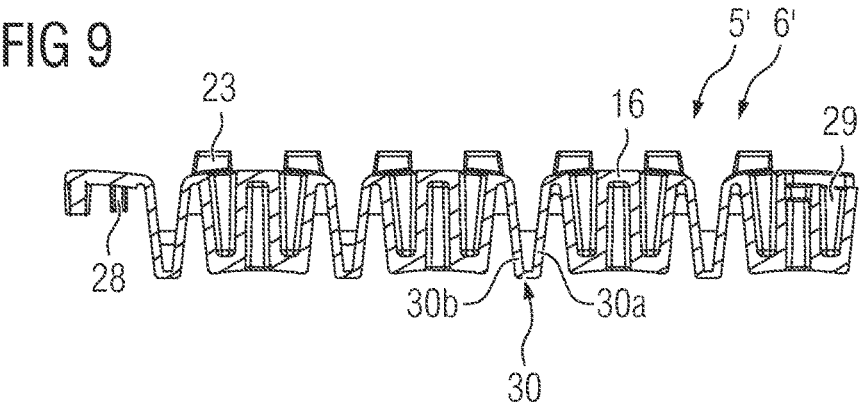
Figure 10:
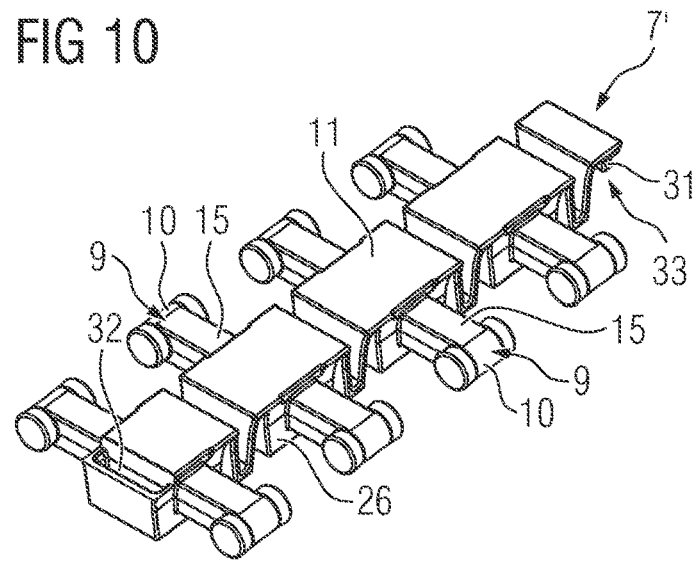
Figure 11:
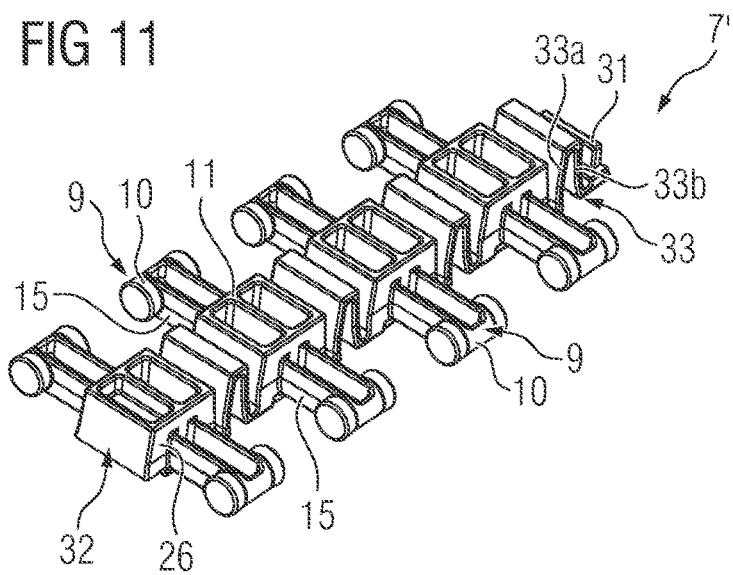
Figure 12:
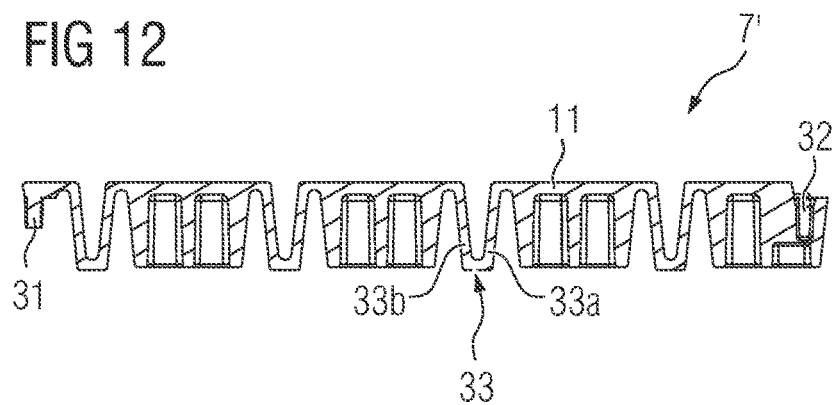
Figure 13:
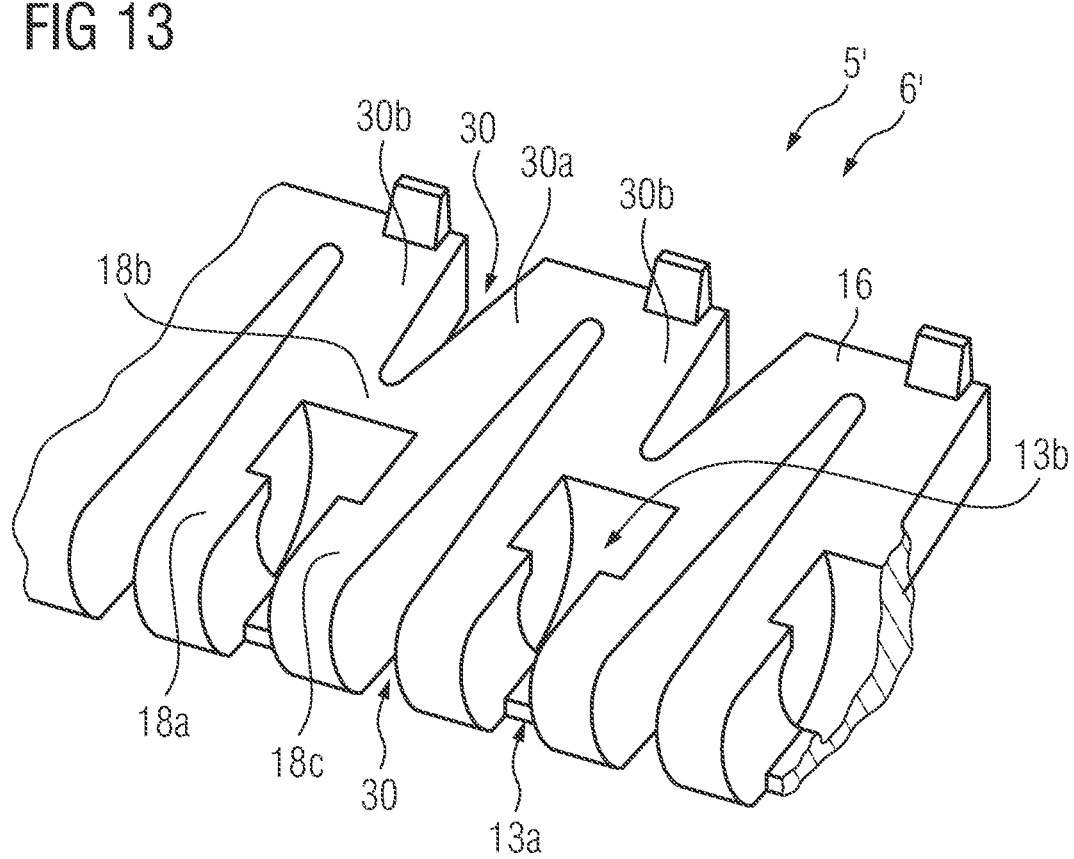

Further advantages and details of the invention can be taken from the exemplary embodiments described below and with the aid of the drawings. The figures show the following:

FIGS. 1-6 each show a partial illustration of a device for connecting two pipe elements according to an exemplary embodiment;

FIGS. 7-9 each show an illustration of a coupling means part segment of a device for connecting two pipe elements according to an exemplary embodiment;

FIGS. 10-12 each show an illustration of an intermediate connecting part segment of a device for connecting two pipe elements according to an exemplary embodiment;

FIG. 13 shows a partial illustration of a coupling means part segment of a device for connecting two pipe elements according to a further exemplary embodiment; and FIGS. 14-17 each show partial illustrations of a coupling means part and an intermediate connecting part according to further exemplary embodiments.

FIGS. 1-6 each show a partial illustration of a device 1 for connecting two pipe elements 2, 3 according to an exemplary embodiment. The device 1 is illustrated in part in FIGS. 1 and 4 in a perspective view in each case, and in each of FIGS. 2 and 5 in a view (side view) of the free ends, in a circumferential direction, of the device 1 shown in part in FIGS. 1 and 4, and in FIGS. 3 and 6 in a cross-sectional view of the views shown in FIGS. 2 and 5.

In the operational or assembled state of the device 1, it naturally has a hollow-cylinder-like or hollow cylindrical shape in a manner that is known per se. The axis of symmetry or central axis of the device 1 is labelled "A" in the figures.

The pipe elements 2, 3 that are to be connected or that are connected are arranged with respective sections forming respective end faces or end sides positioned opposite each other and in particular abutting each other.

The device 1 is used for axially connecting two pipe elements 2, 3. Although pipe elements 2, 3 with (substantially) identical configurations, i.e. in particular identical external diameters, can be connected in a stable manner using the device 1, as can be seen from FIGS. 1-6 the device 1 is configured to connect pipe elements 2, 3 with significantly different configurations, i.e. in particular external diameters lying far outside of a tolerance range, resulting e.g. from manufacturing, in a stable manner. By means of the device 1, therefore, considerable radial steps (see double arrow S in FIG. 6), in particular up to 100 mm or more, between respective pipe elements 2, 3 to be connected, can be bridged. With the aid of FIGS. 1-6 it can be seen that the connection of the pipe elements 2, 3 is coaxial or concentric, i.e. the axes of symmetry or central axes of the pipe elements 2, 3 lie (substantially) in a common axis of symmetry or central axis A of the device 1.

The device 1 comprises a coupling means 4 as a central functional unit. The coupling means 4 comprises a first hollow cylindrical coupling means part 5, a second hollow cylindrical coupling means part 6 and an annular intermediate connecting part 7. The first coupling means part 5 can be assigned or is assigned to a first pipe element 2. The second coupling means part 6 can be assigned or is assigned to the second pipe element 3 which is connected to the first pipe element 2. The intermediate connecting part 7 is arranged between the two coupling means parts 5, 6; thus, the two coupling means parts 5, 6 are connected to each other axially via the intermediate connecting part 7. The coupling means parts 5, 6 and the intermediate connecting part 7 are each equipped for this purpose with suitable mechanical interfaces, which allow an appropriate axial connection thereof.

The coupling means parts 5, 6 represent (substantially) those functional components of the device 1 which engage around the pipe elements 2, 3 to be connected to each other on the side of the external circumference; the first coupling means part 5 engages around the first pipe element 5 assigned thereto in the region of its external circumference and the second coupling means part 6 engages around the second pipe element 3 assigned thereto in the region of its external circumference. Respective coupling means parts 5, 6 therefore form cylindrical contact areas for respective pipe elements 2, 3; this also applies if an optional, in particular a hollow cylindrical, sealing element 8 is arranged between the coupling means parts 5, 6 and the pipe elements 2, 3.

Figure 4:
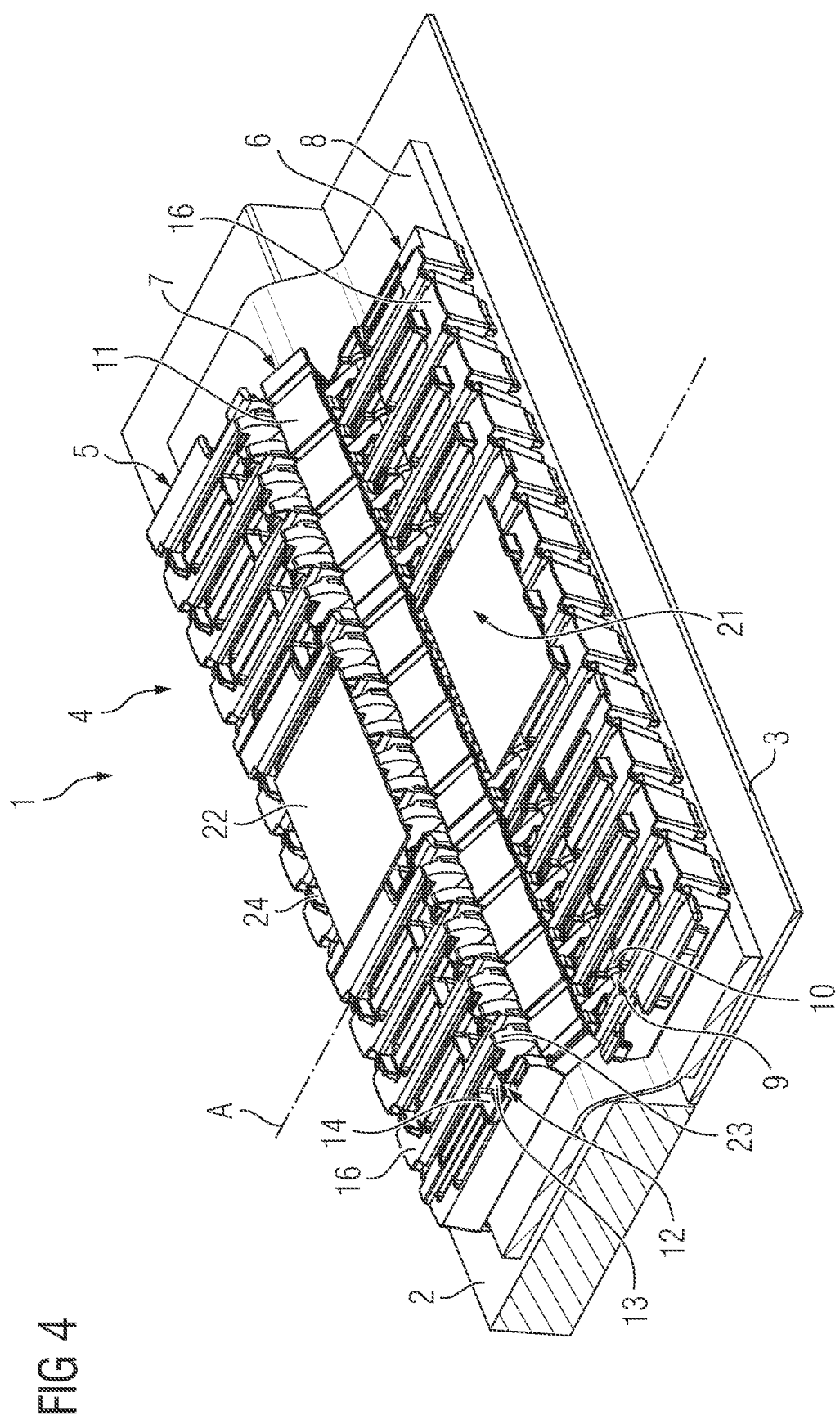
Figure 5:
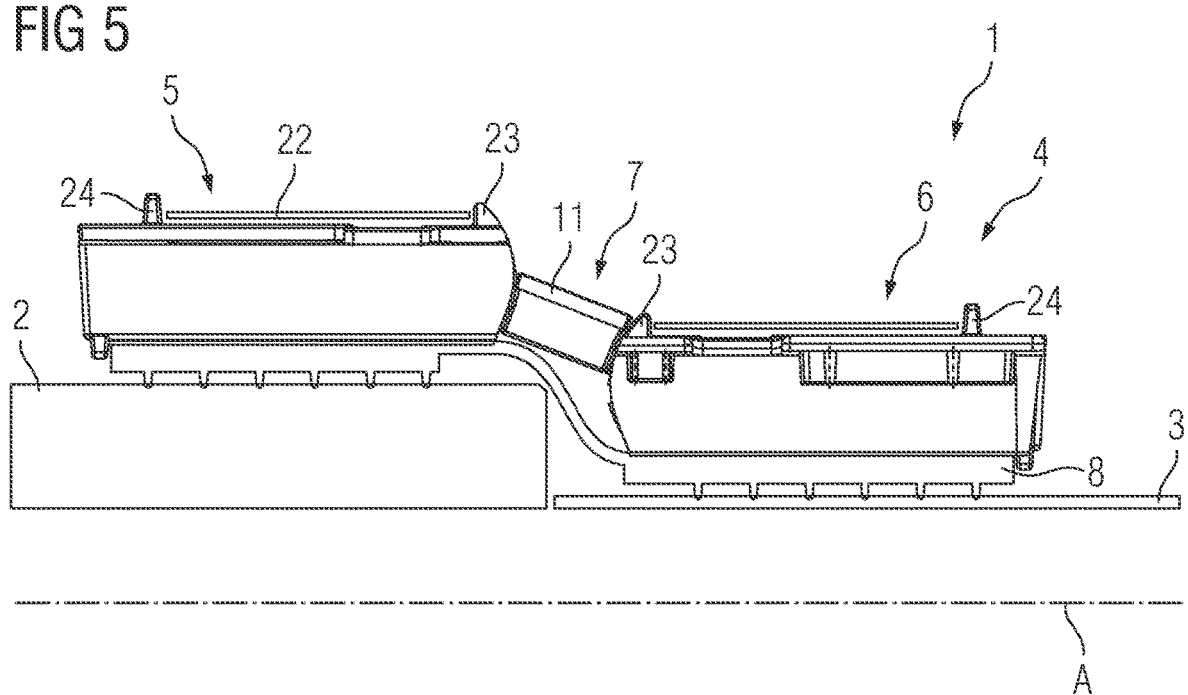
Figure 6:
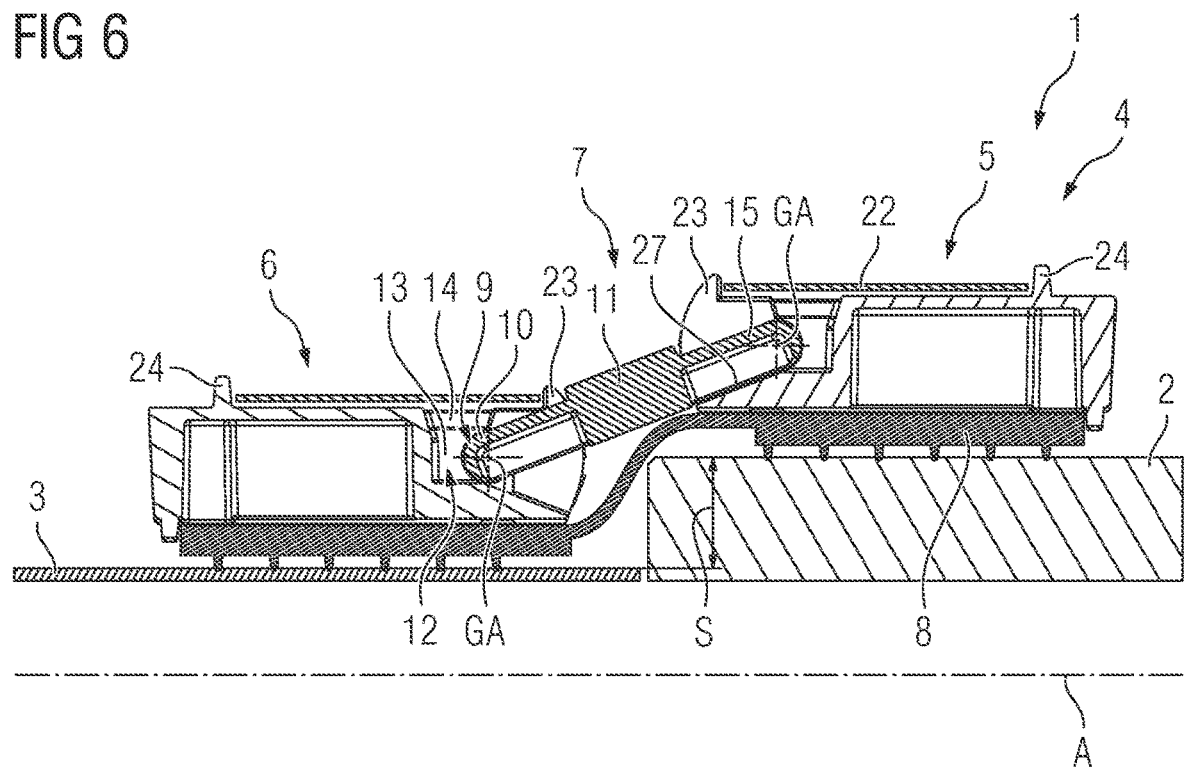

As can be seen with the aid of FIGS. 4-6, the intermediate connecting part 7 can be brought into a cone-like or conical basic shape in the operational or assembled state of the device 1. FIGS. 4-6 show that the intermediate connecting part 7 is brought into an appropriate cone-like or conical basic shape in particular in the case of the bridging of a radial step which is necessary when axially connecting two pipe elements 2, 3 with (significantly) non-identical external diameters.

In the exemplary embodiments shown in the figures, a second articulation element 12 is formed on the first coupling means part 5 and on the second coupling means part 6, i.e. in particular in the region of their respective free axial ends. A respective second articulation element 12 is formed as a receiving element 14 comprising a receiving region 13 for at least partly receiving an engaging element 10 of a first articulation element 9. On the intermediate connecting part 7, i.e. in particular in the region of its respective free axial ends, first articulation elements 9 are formed. A respective first articulation element 9 is formed as an engaging element 10 for engaging in a receiving region 13 of a second articulation element 12.

An engaging element 10 forming a first articulation element 9 is formed in the exemplary embodiments shown in the figures specifically as a joint pin, in particular a cylindrical joint pin, defining an axis of articulation GA; a receiving element 14 forming a second articulation element 13 is formed specifically as a joint pin receptacle in the exemplary embodiments shown in the figures. A respective first articulation element 9 can therefore be received in a second articulation element 13. Respective first and second articulation elements 9, 13 are thus configured to cooperate in the sense of interconnecting parts that can be connected to each other. The cooperation of first and second articulation elements 9, 13 therefore results in an axial coupling or connection of respective articulation elements 9, 13 or of the functional components of the coupling means 4 associated therewith.

The coupling means parts 5, 6 and the intermediate connecting part 7 are configured via the first or second articulation elements 9, 13 respectively that are formed thereon such that the above-mentioned axial connection of the coupling means parts 5, 6 can be formed with interposition of the intermediate connecting part 7 (see in particular FIGS. 1-6). A respective second articulation element 13 on the coupling means part side therefore corresponds to a respective first articulation element 9 on the intermediate connecting part side. In principle, with the proviso that the coupling means parts 5, 6 can be coupled or connected to each other axially with interposition of the intermediate connecting part 7, any possible configurations of respective first and second articulation elements 9, 13 can be obtained.

Figure 3:
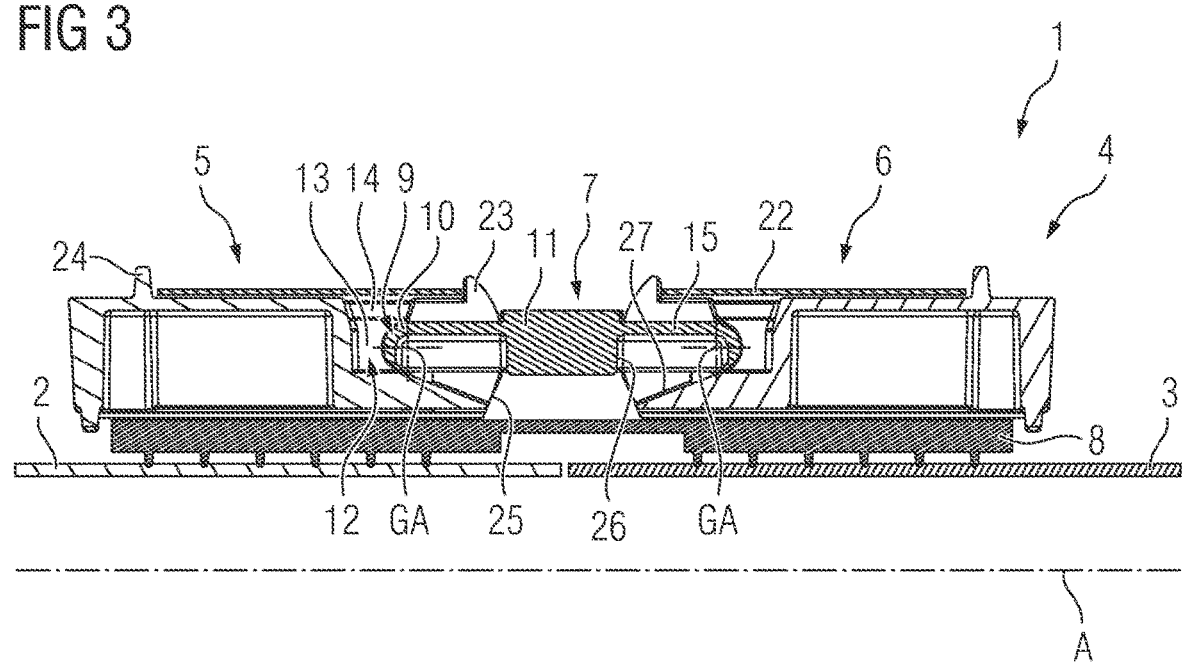

In particular with the aid of FIGS. 3 and 6 it can be seen that the second articulation elements 13 formed on the coupling means parts 5, 6 are configured to cooperate with the first articulation elements 9 formed on the intermediate connecting part 7, in particular in a positive manner, forming an articulated connection, i.e. a rotary joint connection, between the respective coupling means part 5, 6 and the intermediate connecting part 7.

The formation of an articulated connection between the first coupling means part 5 and the intermediate connecting part 7 and between the second coupling means part 6 and the intermediate connecting part 7 results in a significantly improved device 1. The articulated connection represents a way of enabling pipe elements 2, 3 with (significantly) different external diameters to be connected without material deformation of the device 1 in the bridging region typically formed by a joint area of respective pipe elements 2, 3 that are to be connected. The articulated connection allows a continuous articulated deflection or angular deflection of the coupling means parts 5, 6 relative to the intermediate connecting part 7 and vice versa; the effort required for this purpose is close to zero. The articulated connection here enables a particularly high absorption of radially acting transverse or shear forces—as well as an absorption of axially acting normal forces—so that in the operational or assembled state of the device 1 relative radial movements of the pipe elements 2, 3 to be connected, which are caused by transverse or shear forces, are (almost) ruled out; the above-mentioned coaxiality of a connection of the pipe elements 2, 3 made by the device 1 can thus be ensured even when connecting pipe elements 2, 3 with (significantly) non-identical external diameters or in the bridging of (considerable) radial steps which is necessary for this purpose. The device 1 thus enables (almost) any combination of pipe elements with identical or non-identical external diameters to be connected to each other in a stable manner.

The articulated connection formed by cooperation of the second articulation elements 13 formed on the coupling means parts 5, 6 with the first articulation elements 9 formed on the intermediate connecting part 7, as mentioned above, allows a continuous pivoting of the intermediate connecting part 7 into multiple, i.e. in particular almost any, pivot positions relative to the first and/or second coupling means part 5, 6. The intermediate connecting part 7 can be pivoted relative to the coupling means parts 5, 6, e.g. in an angular range of between 0 and ±180° in relation to the central axis A of the device 1, preferably in an angular range of between 0 and ±90° in relation to the central axis A of the device 1.

The intermediate connecting part 7 is shown in each of FIGS. 4-6 in a pivot position that is pivoted relative to the coupling means parts 5, 6.

The articulated connection of the first coupling means part 5 to the intermediate connecting part 7 as well as the articulated connection of the second coupling means part 6 to the intermediate connecting part 7 is in the operational or assembled state of the device 1 can be undetachable or non-releasable in all pivot positions of the intermediate connecting part 7 relative to the coupling means parts 5, 6. The articulated connection can therefore be formed such that, in the operational or assembled state of the device 1, in particular in specific pivot positions in which the intermediate connecting part 7 is severely angled or pivoted relative to the coupling means parts 5, 6 by means of appropriate pivoting, a release of the articulated connection, e.g. by a movement of an engaging element 13, which is received in a receiving element 14, out of the receiving element 14, is impossible.

As mentioned above and as shown in FIGS. 4-6, the intermediate connecting part 7 can be brought into an appropriate cone-like or conical basic shape in association with the bridging of a radial step which is necessary when axially connecting two pipe elements 2, 3 with (significantly) non-identical external diameters. The formation of the cone-like basic shape of the intermediate connecting part 7 is achieved by an appropriate pivoting of the intermediate connecting part 7 relative to the coupling means parts 5, 6 in the operational or assembled state of the device 1. The device 1 can therefore be formed or is formed with a central region, which runs in a cone-like or conical manner, extending in an axial direction between the first and second coupling means parts 5, 6, by means of a pivoting of the intermediate connecting part 7 relative to the coupling means parts 5, 6.

It can be seen from FIGS. 1-6 that the intermediate connecting part 7 comprises multiple, in particular cuboid-like or cuboid-shaped, basic sections 11 arranged adjacently in a circumferential direction and aligned (substantially) in an axial direction in the operational or assembled state of the device 1. Respective first articulation elements 9 formed on the intermediate connecting part 7 are formed by way of example in the exemplary embodiment on a projection 15 projecting in a rib-like manner, in particular in an axial direction, from the basic section 11 (see also FIGS. 10 and 11). Alternatively, e.g. a direct formation of first articulation elements 9 on a rib-like basic section 11 (see FIG. 17) would also be possible, so that the intermediate connecting part 7 can have a geometric shape like a bone or I-beam.

From FIGS. 1-6 as well as from FIGS. 7-9, it can further be seen that the first and second coupling means parts 5, 6 also comprise multiple, in particular cuboid-like or cuboid-shaped, basic sections 16 arranged adjacently in a circumferential direction and aligned (substantially) in an axial direction in the operational or assembled state of the device 1. The second articulation elements 12 formed on the coupling means parts 5, 6 are formed by respective recesses 17 in the basic sections 16 forming a respective receiving region 13.

The recesses 17 in the basic sections 16 of the coupling means parts 5, 6 are formed by multiple wall elements 18a-18c of the respective basic sections 16 defining the recesses 17. The wall elements 18a, 18c form an axial pull-out prevention means for an engaging element 10 of a first articulation element 9 engaging in the receiving region 13 which, in the operational or assembled state of the device 1, prevents an axial movement of the engaging first articulation element 9 towards the axially opposite coupling means part 5, 6. The wall elements 18a, 18c forming the axial pull-out prevention means can engage around and/or over part of an engaging element 10 of a first articulation element 9 engaging in the receiving region 13, in particular in a positive manner.

The walls 18a, 18c defining the recesses 17 in the basic sections 16 of the coupling means parts 5, 6 furthermore form a radial pull-out prevention means for an engaging element 10 of a first articulation element 9 engaging in the receiving region 13 which, in the operational or assembled state of the device 1, prevents a radial movement of the engaging first articulation element 9 relative to the respective coupling means part 5, 6. The wall elements 18a, 18c forming the radial pull-out prevention means can engage around and/or over part of an engaging element 10 of a first articulation element 9 engaging in the receiving region 13, in particular in a positive manner. To this end, the wall elements 18a, 18c are formed with e.g. claw-like wall element sections 19, 20.

With the aid of FIGS. 7-9 it can be seen that the recesses 17 in the respective basic section 16 of the coupling means parts 5, 6 are open in a radial direction in relation to the central axis A of the device 1, i.e. in a radial direction outwards. In this way, simple assembly and disassembly of the device 1 are made possible by the fact that, for assembly of the device 1, respective engaging elements 10 of first articulation elements 9 are arranged in respective recesses 17 in a radial direction and, for disassembly of the device 1, respective engaging elements 10 of first articulation elements 9 that are arranged in respective recesses 17 are removed from respective recesses 17 in a radial direction.

With the aid of FIGS. 1-6 it can be seen that the recesses 17 of respective basic sections 16 are closed off in the operational or assembled state of the device 1, so that engaging elements 10 arranged therein cannot be removed therefrom. Respective recesses 17 in respective basic sections 16 of the coupling means parts (5, 6) which are open in a radial direction in relation to the central axis A of the device 1 open out into a receiving channel 21 extending in a circumferential direction around the respective coupling means parts, as can be seen from FIGS. 2, 3 and/or 5, 6, defined by respective radial protrusions 23, 24 for receiving a clamping element 22, in particular a strip-, sleeve- or clip-like clamping element 22, surrounding the respective coupling means part 5, 6 in a circumferential direction. The recesses 17 can therefore be closed off in a radial direction by a clamping element 22 received in the receiving channel 21, in particular in such a way that an engaging element 10 received in the receiving region 13 cannot be moved out of the recess 17 or the receiving region 13 in a radial direction (see FIGS. 5, 6).

For the configuration of the coupling means 4 shown by way of example in the figures with second articulation elements 12 formed on the coupling means parts 5, 6 and first articulation elements 9 formed on the intermediate connecting part 7, it is the case that a respective receiving region 13 of a second articulation element 12 comprises a first receiving region section 13a which, in the operational or assembled state of the device 1, receives the projection 15 projecting in a rib-like manner from a basic section 11 of the intermediate connecting part 7, and a second receiving region section 13b communicating with the first receiving region section 13a which, in the operational or assembled state of the device 1, receives the first articulation element 9 formed on the respective rib-like projection 15.

It can further be seen from FIGS. 7-12 that the basic sections 16 of the coupling means parts 5, 6 are each formed, in the region of their free ends facing the intermediate connecting part 7 in an axial direction in the operational or assembled state of the device 1, with a guiding surface 25, which in particular extends in a curved manner. The basic sections 11 of the intermediate connecting part 7 are formed, in the region of their free ends facing the coupling means parts 5, 6 in an axial direction in the operational or assembled state of the device 1, with e.g. corresponding mating surfaces 26, which in particular extend in the same curved manner in an opposite direction. The guiding and mating surfaces 25, 26 serve on the one hand to allow guided relative movements of the intermediate connecting part 7 relative to the coupling means parts 5, 6. The mating surfaces 26 on the intermediate connecting part side can be moved (in the case of pivoting movements of the intermediate connecting part 7 relative to the coupling means parts 5, 6) relative to the coupling means parts 5, 6 along respective guiding surfaces 25 on the coupling means part side. On the other hand, the guiding and mating surfaces 25, 26 facing each other in an axial direction serve to absorb forces acting in an axial direction that may occur during operation of the device 1. To this extent, the guiding and mating surfaces 25, 26 can also be regarded or designated as axial stop and counter-stop surfaces respectively, which are designed to absorb forces acting in an axial direction.

With the aid of FIGS. 3 and 6 it can be seen that a respective basic section 16 on the coupling means part side is formed with a radial stop surface 27 defining an articulation end position of the intermediate connecting part 7 relative to the respective coupling means part 5, 6. By defining appropriate articulation end positions, the stability of the device 1 can be further increased, since an angular deflection or pivoting of the intermediate connecting part 7 relative to the coupling means parts 5, 6 is possible only to a defined degree. Respective radial stop surfaces 27 are formed as ramp surfaces extending in an axial direction in a ramp-like manner with a specific angle of inclination in relation to the central axis A of the device 1. By means of the angle of inclination of the respective ramp surfaces, the respective angle of the articulation end position of the intermediate connecting part 7 relative to the respective coupling means part 5, 6 can be defined.

From FIGS. 7-12 it can be seen that the coupling means parts 5, 6 as well as the intermediate connecting part 7 can each be formed in a segmented manner in a circumferential direction. The coupling means parts 5, 6 are therefore formed by multiple coupling means part segments 5', 6' that can be connected or are connected to each other in a circumferential direction forming a coupling means part 5, 6; the intermediate connecting part 7 is formed by multiple intermediate connecting part segments 7' that can be connected or are connected to each other in a circumferential direction forming the intermediate connecting part 7. Each coupling means part segment 5', 6' as well as each intermediate connecting part segment 7' extends in a circumferential direction around a portion of the overall extent, in a circumferential direction, of the respective coupling means part 5, 6 or of the intermediate connecting part 7 respectively.

An exemplary embodiment of a coupling means part segment 5', 6'—corresponding coupling means part segments 5', 6' are typically identical in form—is illustrated in FIGS. 7 to 9. The coupling means part segment 5', 6' is illustrated in FIG. 7 in a first perspective view (top), in FIG. 8 in a second perspective view rotated by 180° (bottom) and in FIG. 9 in a longitudinal section view.

The coupling means part segment 5', 6' is formed, in the region of its basic section regions that are arranged adjacently in a circumferential direction in the operational or assembled state of the device 1, with connection elements 28, 29, which are formed for the connection, in particular the releasable connection (in a damage-free or non-destructive manner), of immediately adjacently arranged coupling means part segments 5', 6' in a circumferential direction. Respective connection elements 28, 29 are formed as positively locking elements in the exemplary embodiment, i.e. for example as plug-in elements, i.e. for example as radially oriented plug-in sections and associated plug-in receiving means, which cooperate forming a positive connection of respective coupling means part segments 5', 6 that are arranged adjacently, in particular in a circumferential direction.

With the aid of FIGS. 7-9 it can be seen that a coupling means part segment 5', 6' comprises multiple basic sections 16. However, it is also possible for a coupling means part segment 5', 6' to be configured with only one (single) basic section 16. For the coupling means part segment 5', 6' shown in FIGS. 7-9, comprising multiple basic sections 16 arranged adjacently in a circumferential direction, it is the case that the basic sections 16 arranged immediately adjacently in a circumferential direction are each connected to one another via a structural element 30 which is expandable and/or compressible in a circumferential direction and which is in particular pleat-like. As a result of the formation or arrangement of appropriate structural elements 30 between basic sections 16 that are arranged immediately adjacently in a circumferential direction, the coupling means part segment 5', 6' has expandable and/or compressible properties in a circumferential direction. The structural elements 30 are designed such that they allow an expansion and/or compression of the coupling means part segment 5', 6' in a circumferential direction, providing space. A coupling means part 5, 6 formed from multiple corresponding coupling means part segments 5', 6' can therefore be expanded and/or compressed in a circumferential direction in the operational or assembled state of the device 1.

With the aid of FIG. 8 it can be seen that a structural element 30 can be formed by multiple structural element sections 30a, 30b oriented at an angle to each other, in particular in a V-shape. By means of appropriate structural element sections 30a, 30b, axially extending slot structures are formed, which provide sufficient space for an appropriate expansion and/or compression of the coupling means part segments 5', 6' and/or of the coupling means part 5, 6 in a circumferential direction.

An exemplary embodiment of an intermediate connecting part segment 7'—corresponding intermediate connecting part segments 7' are typically identical in form—is illustrated in FIGS. 10 to 12. The intermediate connecting part subsegment 7' is illustrated in FIG. 10 in a first perspective view (top), in FIG. 11 in a second perspective view rotated by 180° (bottom) and in FIG. 12 in a longitudinal section view.

The intermediate connecting part segment 7' is formed, in the region of its basic section regions that are arranged adjacently in a circumferential direction in the operational or assembled state of the device 1, with connection elements 31, 32, which are formed for the connection, in particular the releasable connection (in a damage-free or non-destructive manner), of immediately adjacently arranged intermediate connecting part segments 7' in a circumferential direction. Respective connection elements 31, 32 are formed as positively locking elements in the exemplary embodiment, i.e. for example as plug-in elements, i.e. for example as radially oriented plug-in sections and associated plug-in receiving means, which cooperate forming a positive connection of respective adjacently arranged intermediate connecting part segments 7', in particular in a circumferential direction.

With the aid of FIGS. 10-12 it can be seen that an intermediate connecting part segment 7' comprises multiple basic sections 11. However, it is also possible that an intermediate connecting part segment 7' is configured with only one (single) basic section 11. For the intermediate connecting part segment 7' shown in FIGS. 10-12 comprising multiple basic sections 11 arranged adjacently in a circumferential direction, it is the case that the basic sections 11 arranged immediately adjacently in a circumferential direction are each connected to one another via a structural element 33 which is expandable and/or compressible in a circumferential direction and which is in particular pleat-like. As a result of the formation or arrangement of appropriate structural elements 33 between basic sections 11 that are arranged immediately adjacently in a circumferential direction, the intermediate connecting part segment 7' has expandable and/or compressible properties in a circumferential direction. The structural elements 33 are designed such that they allow an expansion and/or compression of the intermediate connecting part segment 7' in a circumferential direction, providing space. The intermediate connecting part 7 formed from multiple corresponding intermediate connecting part segments 7' can therefore be expanded and/or compressed in a circumferential direction in the operational or assembled state of the device 1.

With the aid of FIG. 11 it can be seen that a structural element 33 can be formed by multiple structural element sections 33a, 33b oriented at an angle to each other, in particular in a V-shape. By means of appropriate structural element sections 33a, 33b, axially extending slot structures are formed, which provide sufficient space for an appropriate expansion and/or compression of the intermediate connecting part segment 7' and/or of the coupling means part 5, 6 in a circumferential direction.

Appropriate structural element sections 33a, 33b are spaced apart such that, in the operational or assembled state of the device 1, they are (substantially) immediately adjacent to each other in a circumferential direction in the region of the inner circumference of the device 1. The inner circumference of the intermediate connecting part 7 can therefore be (substantially) closed in the operational or assembled state of the device 1. A sealing element 8 arranged between the coupling means 4 and the pipe elements 2, 3 to be connected is thus not given the ability to be pressed into radial gaps, which would be formed e.g. between structural element sections 33a, 33b that are arranged immediately adjacently in a circumferential direction.

FIG. 13 shows a partial illustration of a coupling means part segment 5', 6' according to a further exemplary embodiment.

With the aid of FIG. 13 it can be seen that respective structural elements 30 can also be formed e.g. by structural element sections 30a, 30b projecting from the basic section 16 in an axial direction in a fork-like or fork-shaped manner. The arrangement and alignment of the structural element sections 30a, 30b result in slot structures that are open in an axial direction, which provide sufficient space for an appropriate expansion and/or compression of respective coupling means part segments 5', 6' in a circumferential direction.

FIGS. 14-17 each show partial illustrations of a coupling means part 5, 6 or of an intermediate connecting part 7 according to further exemplary embodiments.

Figure 14:
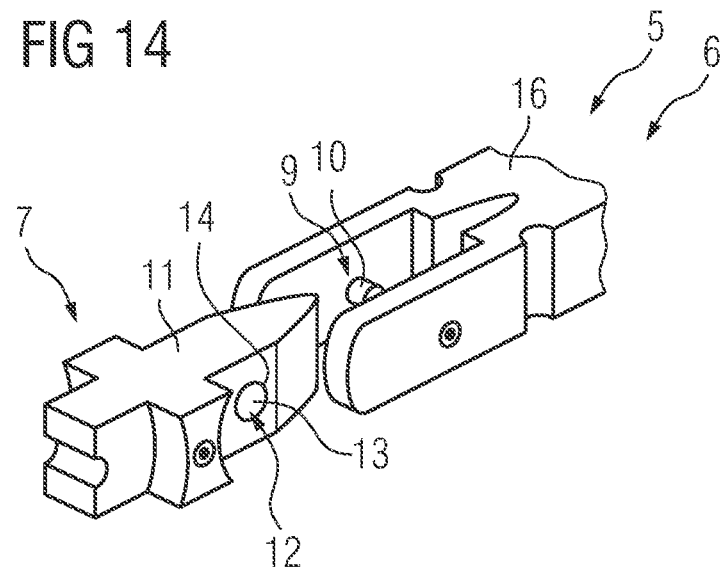
Figure 15:
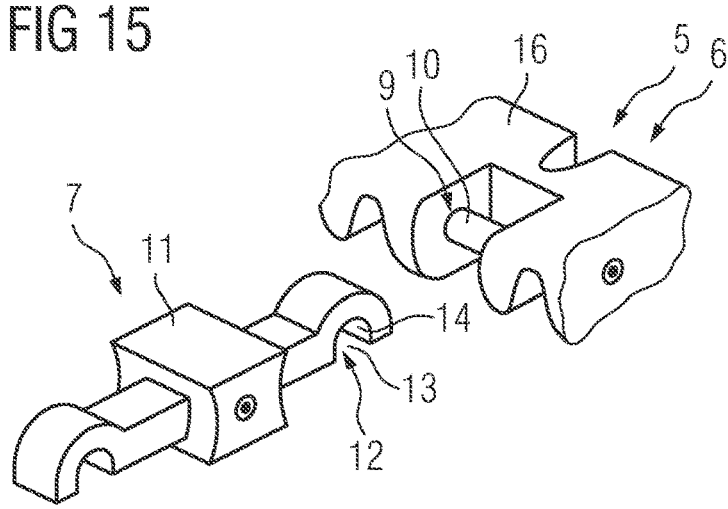
Figure 16:
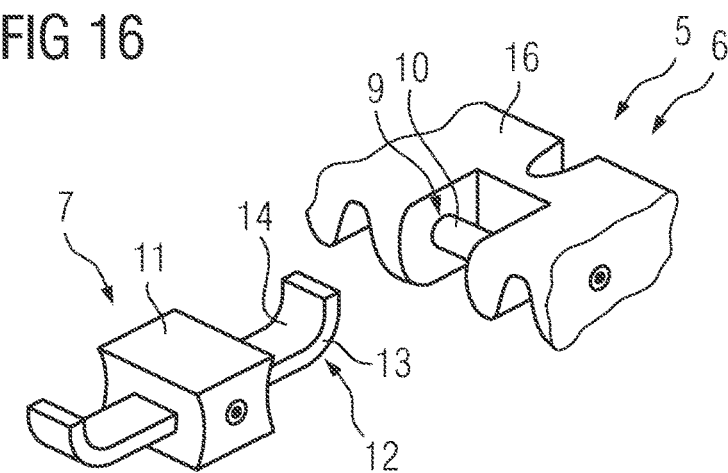
Figure 17:
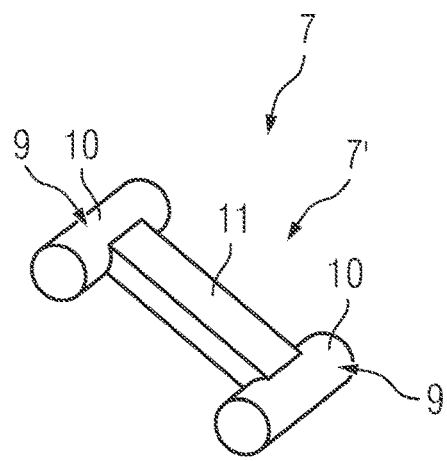

With the aid of FIGS. 14-16, further geometric/structural embodiments of the first and second articulation elements 9, 12 can be seen, and with the aid of FIG. 17 a further embodiment of an intermediate connecting part 7 or intermediate connecting part segment 7' can be seen.

In the exemplary embodiment shown in FIG. 14, first articulation elements 9 are formed as appropriate engaging elements 10 on a basic section 16 on the coupling means part side. The engaging elements 10 are joint pins, in particular cylindrical joint pins, defining an axis of articulation GA. Second articulation elements 12 in the form of appropriate receiving elements 14 forming appropriate receiving regions 13 are formed on a basic section 11 on the intermediate connecting part side.

In the exemplary embodiment shown in FIG. 15 too, first articulation elements 9 are formed as appropriate engaging elements 10 on a basic section 16 on the coupling means part side. The engaging elements 10 again are joint pins, in particular cylindrical joint pins, defining an axis of articulation GA. Second articulation elements 12 in the form of appropriate receiving elements 14 forming appropriate receiving regions 13 are formed on a basic section 11 on the intermediate connecting part side. The receiving regions 13 on the intermediate connecting part side are configured to engage around part of the engaging elements 10 on the coupling means part side; therefore the engaging elements 10 are partly received in the receiving regions 13 in the operational or assembled state of the device 1.

In the exemplary embodiment shown in FIG. 16 too, first articulation elements 9 are formed as appropriate engaging elements 10 on a basic section 16 on the coupling means part side. The engaging elements 10 again are joint pins, in particular cylindrical joint pins, defining an axis of articulation GA. Second articulation elements 12 in the form of appropriate receiving elements 14 forming appropriate receiving regions 13 are formed on a basic section 11 on the intermediate connecting part side. The receiving regions 13 on the intermediate connecting part side are again configured to engage around part of the engaging elements 10 on the coupling means part side; therefore the engaging elements 10 are partly received in the receiving regions 13 in the operational or assembled state of the device 1.

In the exemplary embodiment shown in FIG. 17 the basic section 11 of the intermediate connecting part 7 or of the intermediate connecting part segment 7' has a rib-like basic shape. The first articulation elements 9 are formed directly on the rib-like basic section 11, so that the intermediate connecting part 7 has a geometric shape like a bone or I-beam.

The invention claimed is:

1. A device for axially connecting two pipe elements, comprising:
    a coupling means comprising a first coupling means part, having a cylindrical shape in the assembled state of the device, which can be assigned to a first pipe element, a second coupling means part having a cylindrical shape in the assembled state of the device, which can be assigned to a second pipe element to be connected axially to the first pipe element, and an intermediate connecting part which can be arranged between the first and second coupling means parts, wherein the first and second coupling means parts can be connected or are connected to each other axially via the intermediate connecting part, wherein
    the first and second coupling means parts each comprising a coupling means part articulation element adapted to engage an intermediate connecting part articulation element in a receiving region,
    the intermediate connecting part comprising an intermediate connecting part articulation element adapted to engage the coupling means part articulation element,
    wherein the coupling means articulation element is configured to cooperate with the intermediate connecting part articulation element in a positive locking manner, forming an articulated connection between the first or second coupling means part and the intermediate connecting part; wherein
    the first or second coupling means part comprises a coupling means mating section formed on the respective first or second coupling means part at an axial end facing the intermediate connecting part in an axial direction in the assembled state of the device, wherein the coupling means mating section comprises a curved guiding surface, and wherein
    the intermediate connecting part comprises an intermediate connecting part mating section formed on the intermediate connecting part in a region separated from the intermediate connecting part articulation element and facing the first or second coupling means part in an axial direction in the assembled state of the device, with a corresponding curved mating guiding surface; wherein
    the curved guiding surface of the first or second coupling means part and the corresponding curved mating guiding surface of the intermediate connecting part are configured to cooperate in the assembled state of the device to absorb forces acting in an axial direction that occur during operation of the device.

2. The device according to claim 1, wherein the articulated connection formed by cooperation of the coupling means articulation element formed on the first or second coupling means part with the intermediate connecting part articulation element formed on the intermediate connecting part permits pivoting of the intermediate connecting part into multiple pivot positions relative to the first or second coupling means part.

3. The device according to claim 2, wherein the articulated connection of the first coupling means part with the intermediate connecting part and the articulated connection of the second coupling means part with the intermediate connecting part are non-releasable in all pivot positions of the intermediate connecting part relative to the first or second coupling means part.

4. The device according to claim 1, wherein the intermediate connecting part comprises at least one basic section, wherein the intermediate part articulation element formed on the intermediate connecting part is formed on the basic section or wherein the intermediate part articulation element is formed on a projection projecting in a rib manner from the basic section.

5. The device according to claim 1, wherein the first or second coupling means part comprises a basic section,
    wherein the coupling means part articulation element formed on the first or second coupling means part is formed on a projection projecting in a rib manner from the basic section, or
    wherein the coupling means part articulation element formed on the first or second coupling means part is formed by a recess in the basic section forming the receiving region.

6. The device according to claim 5, wherein the recess is formed by at least one wall element(s) defining the recess, wherein the at least one wall element forms an axial pull-out prevention means for an engaging element of the coupling means part articulation element or the intermediate part articulation element engaging in the receiving region in the assembled state of the device.

7. The device according to claim 5, wherein the recess is formed by at least one wall element defining the recess, wherein the at least one wall element forms a radial pull-out prevention means for an engaging element of the coupling means part articulation element or the intermediate part articulation element engaging in the receiving region.

8. The device according to claim 5, wherein the recess is open in a radial direction in relation to the central axis of the device.

9. The device according to claim 8, wherein the recess formed in the first or second coupling means part is open in a radial direction in relation to the central axis of the device, wherein the recess opens into a receiving channel extending in a circumferential direction around the first or second coupling means part to receive a clamping element surrounding the first or second coupling means part in a circumferential direction, wherein the recess can be closed off at least partly in a radial direction by the clamping element received in the receiving channel such that an engaging element of the intermediate connecting part articulation element received in the receiving region cannot be moved out of the receiving region in a radial direction.

10. The device according to claim 4, wherein a receiving region is formed in the first or second coupling means part and comprises a first receiving region section which, in the assembled state of the device, receives the projection projecting in a rib manner from the at least one basic section of the intermediate connecting part, and a second receiving region section, which, in the assembled state of the device, receives the intermediate connecting part articulation element formed on the projection.

11. The device according to claim 4, wherein the at least one basic section of the intermediate connecting part is oriented towards the first or second coupling means part and is formed with a radial stop surface defining an articulation end position of the intermediate connecting part relative to the respective coupling means part.

12. The device according to claim 1, wherein the intermediate connecting part is formed in a segmented manner in a circumferential direction, wherein the intermediate connecting part comprises multiple intermediate connecting part segments that can be connected in a circumferential direction to form the intermediate connecting part, each connecting part segment comprising at least one basic section.

13. The device according to claim 12, wherein at least one of the muitiple intermediate connecting part segmenta comprises a plurality of the basic sections arranged adjacently in a circumferential direction, wherein the plurality of the basic sections are arranged directly adjacently in a circumferential direction and are connected to each other via at least one structural element, the at least one structural element is expandable or compressible in a circumferential direction.

14. The device according to claim 1, wherein first or second coupling means part is formed in a segmented manner in a circumferential direction, wherein the first or second coupling means part comprises multiple coupling means part segments, each comprising at least one basic section, the coupling means part segments can be connected in a circumferential direction to form the first or second coupling means part.

15. The device according to claim 14, wherein each of the coupling means part segments comprise multiple basic sections arranged adjacently in a circumferential direction, wherein the multiple basic sections are arranged directly adjacently in a circumferential direction and are connected to each other via at least one structural element, the at least one structrual element is expandable or compressible in a circumferential direction.

16. The device according to claim 1, wherein an engaging element forming the coupling means part articulation element or the intermediate connecting part articulation element is formed as or comprises a joint pin defining an axis of articulation, and a receiving element forming the coupling means part articulation element or the intermediate connecting part articulation element is formed as or comprises a joint pin receptacle.

* * * * *